US008842352B2

(12) United States Patent
Oettinger et al.

(10) Patent No.: US 8,842,352 B2
(45) Date of Patent: Sep. 23, 2014

(54) METHOD TO IMPROVE SCAN-LINE ALIGNMENT BY ADJUSTING THE PIXEL RATE

(75) Inventors: Eric Gregory Oettinger, Rochester, MN (US); James Eugene Noxon, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 847 days.

(21) Appl. No.: 11/505,958

(22) Filed: Aug. 17, 2006

(65) Prior Publication Data

US 2008/0043308 A1 Feb. 21, 2008

(51) Int. Cl.
*G02B 26/08* (2006.01)
*G02B 26/10* (2006.01)
*H04N 1/053* (2006.01)
*H04N 1/113* (2006.01)
*H04N 1/12* (2006.01)

(52) U.S. Cl.
CPC ............ *G02B 26/105* (2013.01); *H04N 1/1135* (2013.01); *H04N 1/12* (2013.01); *H04N 2201/04768* (2013.01); *H04N 1/053* (2013.01); *H04N 2201/0471* (2013.01); *Y10S 359/904* (2013.01)
USPC ...................... 359/213.1; 359/224.1; 359/904

(58) Field of Classification Search
USPC .......... 359/197–199, 213–215, 223–224, 900
See application file for complete search history.

(56) References Cited

U.S. PATENT DOCUMENTS

| 5,438,620 A * | 8/1995 | Ryan et al. ..................... 380/218 |
| 6,515,278 B2 * | 2/2003 | Wine et al. ..................... 250/234 |
| 2005/0030606 A1 * | 2/2005 | Nakajima ..................... 359/223 |

OTHER PUBLICATIONS

Lissajous 'figure' 2000, in The Penguin Dictionary of Physics, Penguin, London, United Kingdom, viewed Jan. 9, 2009, <http://www.credoreference.com/entry/1429690/.>*

* cited by examiner

*Primary Examiner* — J Doak
(74) *Attorney, Agent, or Firm* — William B. Kempler; Frederick J. Telecky, Jr.

(57) ABSTRACT

A method for improving the alignment of the bi-directional scan lines of a resonant mirror imaging system is disclosed. The method includes sensing the position of the mirror and selecting a portion of each scan line, such as the exact middle 50% and the start points of the scan lines in both directions for displaying the image. Determine the specific number of pixels used to modulate the scan lines and the clocking rate at which the pixels are inserted on the light beam so that the pixels completely fill the selected portion of the scan lines. The clock rate is then adjusted to the determined rate.

18 Claims, 7 Drawing Sheets

METHOD TO IMPROVE SCAN-LINE ALIGNMENT BY ADJUSTING THE PIXEL RATE

TECHNICAL FIELD

The present invention relates to increasing the brightness of a video display or the printing speed of a printer using a high speed scanning mirror. The improvement is achieved by painting an image in both directions as the mirror sweeps back and forth. The invention further relates to aligning the start and end pixels of a scan line with the end and start pixels of an adjacent scan line. More particularly, the invention relates to the alignment of adjacent scan lines by adjusting the start location and the rate at which pixels are clocked on to a light beam reflected off of the scanning mirror as it sweeps back and forth.

BACKGROUND

In recent years torsional hinged high frequency mirrors (and especially resonant high frequency mirrors) have made significant inroads as a replacement for spinning polygon mirrors as the drive engine for laser printers. These torsional hinged high speed resonant mirrors are less expensive and require less energy or drive power than the earlier polygon mirrors.

As a result of the observed advantages of using the torsional hinged mirrors in high speed printers, interest has developed concerning the possibility of also using a similar mirror system for video displays that are generated by scan lines on a display surface.

Standard CRT (cathode ray tube) video systems for displaying scan-lines use a low frequency positioning circuit, which synchronizes the display frame rate with an incoming video signal, and a high frequency drive circuit, which generates the individual image lines (scan lines) of the video. In the prior art systems, the high speed circuit operates at a frequency that is an exact even multiple of the frequency of the low speed drive signal and this relationship simplifies the task of synchronization. Therefore, it would appear that a very simple corresponding torsional hinged mirror system would use a high speed torsional hinged scanning mirror to generate scan lines and a slower torsional hinged mirror to provide the orthogonal motion necessary to position or space the scan lines and thereby produce a raster "scan" similar to the raster scan of the electron beam of a CRT. Unfortunately, the problem is more complex than that. The scanning oscillations of a high speed resonant scanning mirror cannot simply be selected to have a frequency that is an exact even multiple of the positioning motion of the low frequency mirror.

More specifically, the orthogonal positioning motion and, consequently, the low frequency mirror drive signal must be tied to the incoming image frame rate of the video signals to avoid noticeable jumps or jitter in the display. At the same time, however, the high frequency mirror must run or oscillate at substantially its resonant frequency, since driving a high-Q mirror at a frequency only slightly different than the resonant frequency will result in a significant decrease in the amplitude of the beam sweep (i.e. reduce the beam envelope). This would cause a significant and unacceptable compression of the image on the display. Therefore, the high speed mirror drive is decoupled from the low speed mirror drive. That is, as mentioned above, the high speed drive signal cannot simply be selected to be an even multiple of the low speed drive signal.

However, in a video display, each frame of incoming video signals representing video pixels (such as might be received from a DVD player or a VCR player) must still be faithfully reproduced. This means, each pixel of each successive frame of video must be properly located on the screen of the display in both the vertical and horizontal directions if distortions are to be avoided. At the same time, however, and as described above in a torsional hinged mirror based video system, the low frequency mirror drive must still be synchronized to the flow rate of the incoming video signals, and the high speed mirror must oscillate at its resonant frequency. Therefore, since the resonant frequency of the high speed mirror may vary from unit to unit because of manufacturing variables or with environmental conditions, the high speed mirror must be decoupled from the low speed or orthogonal moving mirror. At the same time, the individual pixels of an image must be properly located in both the vertical and horizontal direction to assure high quality images. These problems are even further complicated if an image is generated in both directions by the scanning mirror.

Therefore, a mirror based video system that can meet these requirements would be advantageous.

SUMMARY OF THE INVENTION

These and other problems are generally solved or circumvented, and technical advantages are generally achieved by the embodiments of the present invention, which provides an oscillating resonant mirror imaging system for a high speed printer or visual display system.

More specifically, the method comprises the steps of sensing the actual position of a high speed mirror as it oscillates at its resonant frequency. The precise and known number of image pixels that are used to modulate a light beam reflected by the oscillating mirror to form the scan lines is then distributed onto each scan line at a clocking rate such that the precise number of pixels exactly fills the portion of the scan lines on which the image is displayed.

As an example, the exact middle 50% of each sweep across the display medium (i.e., the display screen or page of paper) may be selected. Thus, by determining the start point of the selected portion of the scan line and adjusting the clocking rate at which pixels are transmitted, alignment of the scan lines is achieved. The method is especially suited for aligning bi-directional scan lines. The actual position of the oscillating mirror may be determined by a pair of sensors located toward the end of a beam sweep. Alternately, a single sensor may be used.

A rotating photosensitive drum may be used to provide the spacing between scan lines when the imaging system is used for a high speed printer. However, for a visual display system, a second slow speed oscillating mirror is used to provide the orthogonal spacing.

More specifically, when used with a visual display system, the slow speed oscillating mirror is driven by a cyclic drive signal (such as for example a sinusoidal or repetative triangular drive signal) to position the low frequency mirror.

Display portions of the drive signal for the low frequency mirror are sandwiched between a lower peak portion and an upper peak portion, and these portions correspond to the mirror positions where an image or partial image frame is generated in the display. Each of the "frames" of video may comprise a complete image or a partial image. It will also be appreciated, that each of the received frames of video signals may arrive at a fixed frequency or the frames may sometimes vary from a fixed frequency, as can occur in the case of a stretched VCR tape.

Therefore, according to another embodiment of the invention, the low speed positioning mirror is synchronized with the incoming data frame rate by adjusting one of the upper or lower peak or turn around portions of the cyclic drive signal so that each frame of video starts at the same position on the low frequency drive signal. In addition, the data for each scan line is stored in a buffer so that the insertion of the data onto the sweeping or scanning beam can be delayed and then synchronized or timed to always occur during a specific portion of the scanning mirror oscillations. However, not only is the distribution of image pixels synchronized with the high speed scanning mirror, for a bi-directional image scan, it is also necessary that the "first" and "last" pixels of a specific scan line be aligned with the "last" and "first" pixels of the adjacent scan lines that are immediately before and immediately after the specific scan line. Of course, for the first scan of an image line, this is true only for the scan line immediately after and for the last scan line of an image is true only for the scan line immediately before.

According to one embodiment, the step of generating the low speed cyclic drive signal may comprise repetitive generation of a series of discrete values that in turn generate a single cycle of the drive signal. The drive signal may then be synchronized with the incoming data signal by adjusting (increasing or decreasing) the number of discrete values making up the peak portion of the signal that drives or positions the low frequency mirror. A change in the number of discrete values changes the timing of the peak point of the drive signal, which in turn allows the incoming data signals to be synchronized with the low speed mirror. More specifically, additional discrete values will, for example, expand the peak portion (i.e. increase the cycle time). Alternately, the number of discrete values may be decreased to compress the peak portion (i.e. decrease cycle time) of the drive signal. Such increasing or decreasing the peak portion of the low frequency drive signals may be accomplished by generating a multiplicity of discrete values that may be optionally selected or not selected as required for a specific cycle. All of the discrete values are stored in a circular buffer and this large number of discrete values include a "surplus" or number of discrete values that is in excess of the number required for a nominal cycle. The circular buffer creates the cyclic motion of the drive signal. The required time to complete the turn around or peak portion of the drive signal and start a new cycle that is synchronized with the incoming image signals may then be provided by positioning the restart or wrap around pointer to include the proper number of the multiplicity of discrete values. Other techniques of adjusting the low speed cyclic drive signal may also be used.

According to the invention, when used with a visual display system, movement of the low speed mirror to a selected position by the drive cycle "arms" the system for the display of each frame at a selected location(s) in its travel. On the other hand, movement of the high speed resonant mirror to a first selected position of its travel as it moves in a first direction of each resonant cycle generates a first "trigger" signal, which initiates the release of a data stream representing one complete scan line from a buffer. Likewise, movement of the scanning mirror to a selected position in the reverse direction generates a second "trigger" signal, which initiates the release of another data stream representing another complete scan line. It will be appreciated, however, that the position of the first and last pixels of a forward scan line is reversed with respect to the first and last pixels of a reversed scan line. It should also be appreciated that there may be hundreds of "trigger" points, which represent the start of hundreds of scan lines, for each frame (i.e., "arming" point).

The "arming" signal may be determined or calculated from the input drive signal that powers the low frequency mirror. However, due to the greater variations in the phase between the high speed mirror drive signal and the high speed mirror position, trigger signals calculated solely from the high speed input drive signals will not likely be accurate. Therefore, at least one sensor positioned to sense the location of the high speed mirror will be required to generate the "trigger" signals. Only one sensor is necessary to calculate the position of the scanning mirror during each high speed cycle for both the first trigger signal in the forward direction, and the second trigger signal in the reverse direction. Of course, if two sensors (i.e., one for each sweep direction) are used to determine the position of the scanning mirror, greater accuracy may be obtained.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 6:
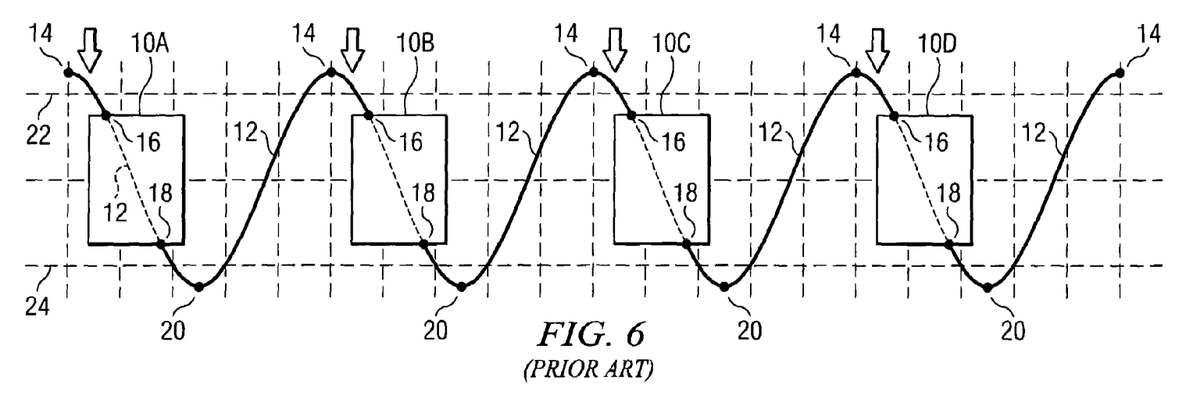
FIG. 6 is a prior art figure showing displays of high frequency video frames where the scan mirror operates at an exact even multiple of the low frequency positioning mirror.

Referring now to prior art FIG. 6, there is illustrated the interaction of a high speed horizontal scanning drive signal and a low speed (vertical) or scan line positioning signal used to control a prior art electronic display formed by a raster scan, such as for example a CRT display. The terms "horizontal", used with respect to scanning drive signals, and "vertical", used with respect to the beam positioning signals are for convenience and explanation purposes only, and it will be appreciated by those skilled in the art that the scan lines could run vertically and the positioning signals could position the vertical scan lines horizontally across a display screen.

As shown in FIG. 6, four typical frames of video such as indicated by image boxes 10a, 10b, 10c, and 10d are generated during the same (substantially linear) portion of each cycle of the slow speed sinusoidal drive signal represented by curve 12. More specifically, if the slow speed positioning signal has a frequency of 60 Hz, then in the example of FIG. 6, sixty different frames of video (i.e. complete images) rather than the four as illustrated will be generated in one second. Therefore, if as shown in the figure, the frequency of the high speed or scanning drive signal is an exact even multiple of the frequency of the low speed signal, then each successive video frame will start and be located at the same position on a CRT display screen. For example, if transition point 14 is at the exact peak of the drive signal, it represents both the end point of each cycle of the electron beam positioning slow speed drive signal and the start point of the next cycle of the drive signal. Therefore, the starting location of a frame of video shown as point 16 will be selected to always occur a specific time period after transition point 14 and can be selected to represent the start point (or placement of the first line) of each frame. Likewise, since each image frame will include the same number of scan lines, point 18 will be the end point (or placement of the last line) of each frame. In the prior art CRT example of FIG. 6, the electron beam retraces or travels in a reverse direction between the lowest point 20 and peak point 14 of the low frequency cycle as the electron beam of the CRT is repositioned for the next frame of video signals. As discussed above, the portion of the low frequency drive signal between points 16 and 18 is substantially linear and is referred to hereinafter as the display portion, whereas the transition top peak point 14 and the lowest peak point 20 not only are not located during a linear portion of the signal, but as mentioned represent where the positioning drive signal actually stops and reverses the direction of the electron beam. These reverse or "turn-around" portions (above line 22 and below line 24) of the drive signal are referred to hereinafter as the upper and lower peak portions or transition points of the drive signal.

Figure 1A:
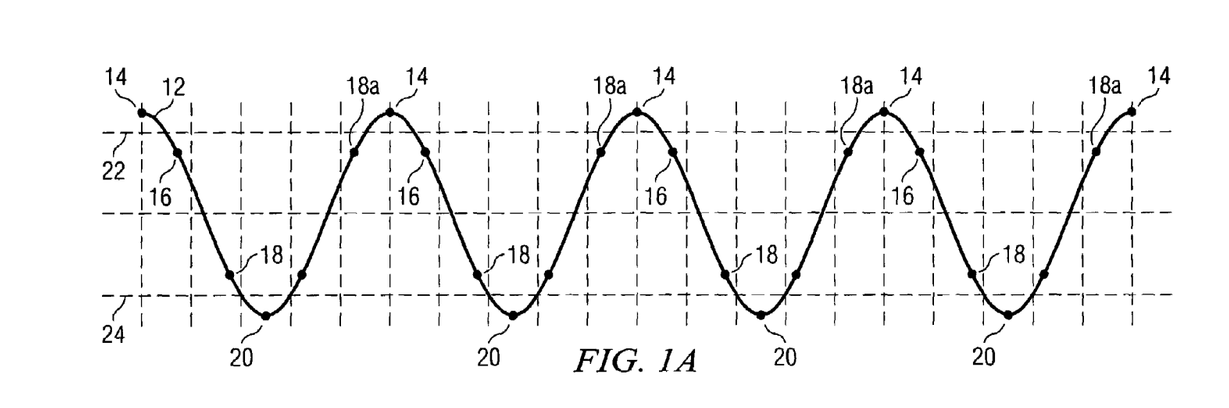
FIG. 1A illustrates the scan line positioning cyclic signals for driving the low speed mirror about its axis.
Figure 1B:
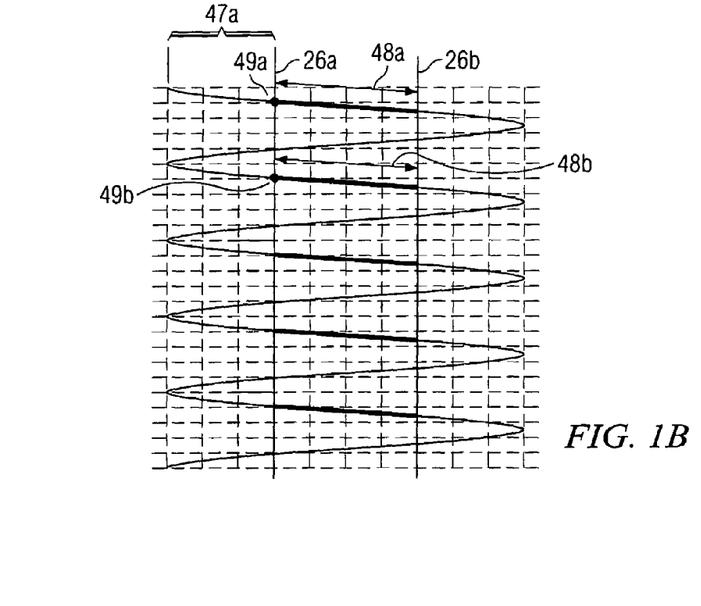
FIG. 1B illustrates the high speed resonant beam sweep and display portions of an unidirectional display.
Figure 1C:
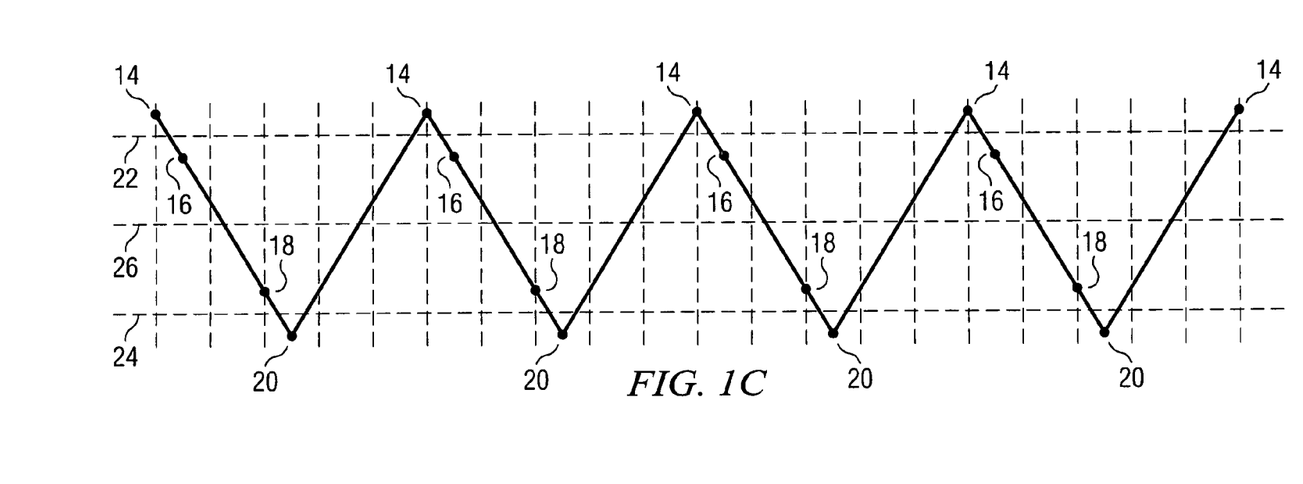
FIG. 1C is the same as FIG. 1A, except a triangular low speed drive signal is illustrated rather than a sinusoidal drive signal.

FIG. 1A is similar to FIG. 6 and represents the positioning or slow speed drive signal of a positioning mirror according to the present invention, but does not illustrate the frames of video. As an example only, the slow speed or positioning mirror may oscillate on the order of 60 CPS (cycles per second) or Hz in a manner similar to the slow speed electron beam drive signal discussed above with respect to prior art FIG. 6. FIG. 1B represents the scanning drive signal and/or the corresponding scanning position of a high speed resonant mirror according to the teachings of the present invention. However, it is not shown to scale with respect to FIG. 1A and, although possible, is not likely at all to be an exact even multiple frequency of the slow speed drive signal. For example, the resonant frequency of a scanning torsional hinged mirror, such as illustrated in FIG. 1B, may be on the order of 20 kHz, 30 kHz, or greater. FIG. 1C is similar to FIG. 1A, except as shown, the slow speed cyclic drive signal has a repetitive triangular shape rather than a sinusoidal shape. The portion of the curve above and below lines 22 and 24 respectively still represent the upper and lower peak (or turn-around) portions of the mirror movement, and the portion of the curve between lines 22 and 24 still represent the display portion of the signal and/or mirror movement where the video frame is generated.

Figure 2A:
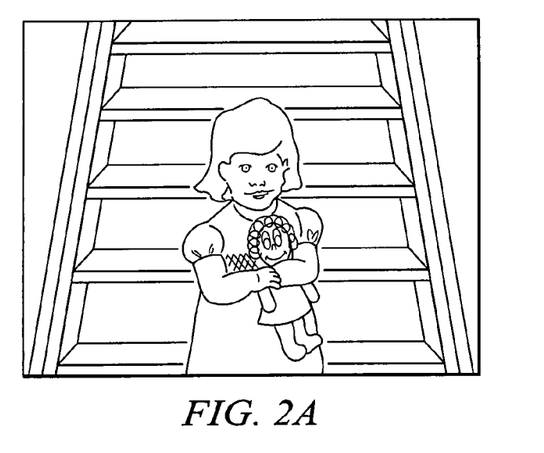
FIG. 2A illustrates an image frame generated by a torsional hinged mirror operating at resonant frequency and at full sweep amplitude.
Figure 2B:
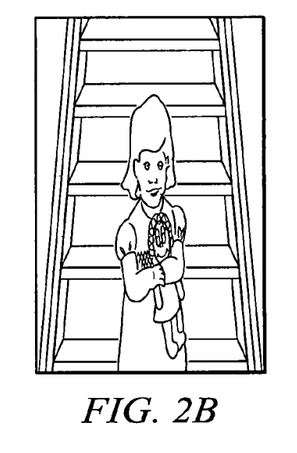
FIG. 2B illustrates an image frame similar to that of FIG. 2A, except the resonant mirror is operated off of resonance and at less than full sweep amplitude.

Therefore, it will be appreciated that if it were possible for the scanning speed of a torsional hinge resonant mirror as represented by the graph of FIG. 1B to simply be selected to be an exact even multiple of the speed of the slow speed positioning mirror, synchronization of a mirror display system could be accomplished in a manner similar to that for a raster scan electron beam display system as discussed above. Unfortunately, although resonant mirrors can be manufactured within reasonable tolerances, the actual resonant frequencies cannot be controlled so that the resonant speed of each mirror of a group of mirrors formed on a silicon wafer could be precisely manufactured as an exact even multiple of a speed selected for the slow speed mirror. Further, as was disclosed above, driving a high speed resonant mirror at a speed only slightly off of its resonant frequency can drastically reduce the sweep amplitude of the mirror, or alternately the mirror may require a significant increase in the energy required to drive the mirror so as to maintain an equivalent sweep amplitude. FIG. 2A illustrates a frame of video generated by a resonant mirror operating at resonance and at full amplitude. FIG. 2B illustrates the same frame of video where the resonant mirror is operating off of its resonant frequency with the resulting significantly reduced sweep amplitude.

Another problem that must be dealt with using a mirror driven system is that for some types of video storage media, a stream of data signals comprising adjacent frames of video may be non-periodic. That is, successive data frames are not always received with the same timing, and consequently, would not appear at the same location on the display without compensation. As an example, if the video storage media is a VCR tape, a portion of the tape may be stretched, and consequently, the frames of data will not be received with the same timing. That is, each frame of data is not received at a constant rate and, therefore, would not be precisely located at the same position on the display without some means of compensation. The present invention solves these various issues by allowing the high speed mirror to always run at its resonant frequency and asynchronously controlling or coupling the cyclic beam positioning signals that drive the slow speed or positioning mirror to each frame of the incoming video signals. The data or signals comprising an image frame typically include a timing signal (or sync or interrupt signal) that can be used to precisely determine the start or end of the next image frame. This allows the slow speed mirror to be synchronized with the incoming data signals so that the image frame may be properly positioned to start at the same point of the display portion during the slow speed mirror movement for each image frame. More specifically, an "arming" signal is generated at selected locations during the mirrors travel. This "arming" signal is synchronized with the interrupt or timing signal that is included with each frame of data.

To accomplish this, a sinusoidal (or repetitive triangular shape) slow speed cyclic drive signal may be generated wherein each point (y) of the drive signal can be expressed as a function of time (i.e. y=f(t)), where "t" represents discrete time values from 0, 1, 2, 3, . . . etc. to an end point "T" such that after the end point is reached, the cyclic drive signal returns to the "0" or exact peak start value, and continually repeats. Therefore, assuming a frame of incoming video data is received and stored (or buffered), and if the first line of each frame is to be synchronized or positioned so that it is provided at a particular point of the slow speed signal subsequent to the interrupt, then adjusting the end point "T" of the drive signal allows the start position of each data frame on a display to be precisely located whether the frequency of the incoming data varies or is fixed.

It is also important, of course, that the data representing each scan or image line be distributed so that the data (pixels) are properly displayed or located in both the horizontal and vertical directions on the display screen during the display portion of the sweep of the resonant mirror. More specifically, the first and last pixels of each line of an image must start and end at substantially the same horizontal location on the display for each sweep of the resonant mirror. In addition, the first line of an image frame or partial frame must be located at substantially the same vertical location for each display cycle. To accomplish starting (and consequently stopping) the scan line at the same horizontal location, the display system of this invention includes at least one sensing device and the corresponding feedback circuitry to allow the actual position of the mirror to be determined at one or more selected points during each repeating scan cycle. Consequently, the position of the scanning mirror can be accurately calculated at any other point of time during a high speed beam sweep cycle, and the appropriate point or location of mirror travel to start a scan line can be determined. To start the scan line at the appropriate location, a "trigger" signal that accurately initiates the release of data from a buffer or storage is generated for each scan or image line. This assures that the image signals representing an image line are released form storage and displayed precisely between the start and end points. As mentioned, the timing of the "trigger" signal can be accurately calculated since the frequency of the scanning mirror is known as well as when the mirror is at one or more precise positions during a beam sweep. Thus, the signals representing each line of an image can be initiated or released from the buffer by the "trigger" signal. As will also be appreciated, there will be several hundred "trigger" signals for each "arming" signal and the corresponding image frame.

Figure 3A:
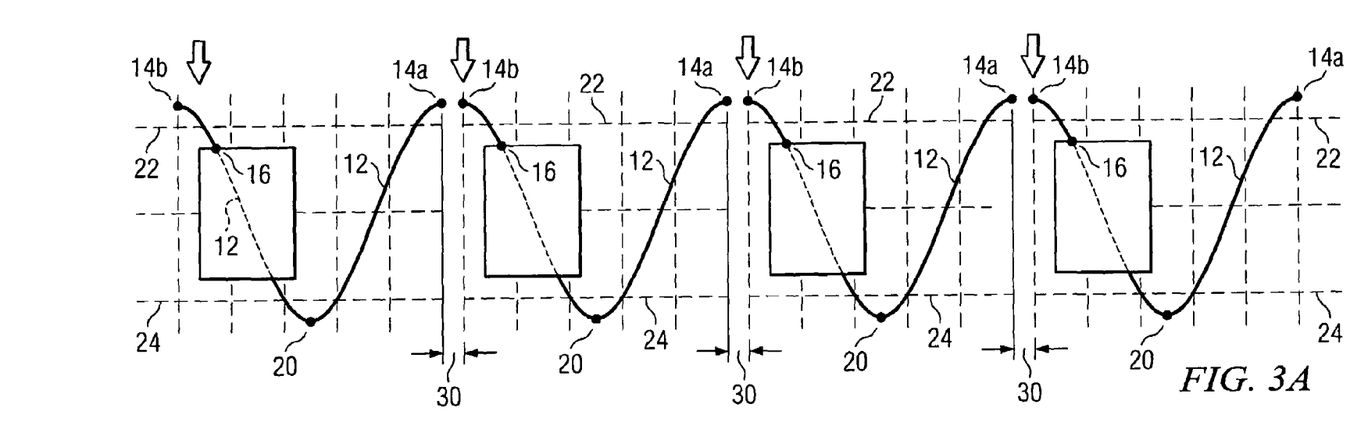
FIGS. 3A and 3B show how the cyclic low speed drive signal of FIG. 1A is stretched or compressed according to the teachings of the invention to properly synchronize the low speed mirror to the incoming video signal.

Referring to FIG. 3A, there is illustrated a condition where the incoming frame of data is received at a rate slightly slower than nominal. That is, the time between successive transition peak points "T" 14 is greater than nominal. Consequently, to assure proper vertical position or placement of the first scan line, a peak portion of the cyclic drive signal is delayed or expanded by a computed amount or time period as representative by the double arrow 30, extending between the end point 14a of a cycle and the exact peak or start point 14b of the next cycle. As shown, this addition time period 30 delays or "expands" the top peak portion of the drive signal and consequently delays the exact peak or start point 14b of the next cycle. Thus, the start point 16 of each data frame can be determined and positioned at substantially the same y-axis location on the display screen or media by referring to the following equations:

$$y(t)=A*\cos(2*\pi*t/T) \text{ for } t=0 \text{ to } T; \text{ and} \quad 1)$$

$$y(t)=y(T) \text{ for } t \geq T_{nom} \quad 2)$$

where A=amplitude of drive signal and $T_{nom}$ is the nominal number of samples.

Figure 3B:
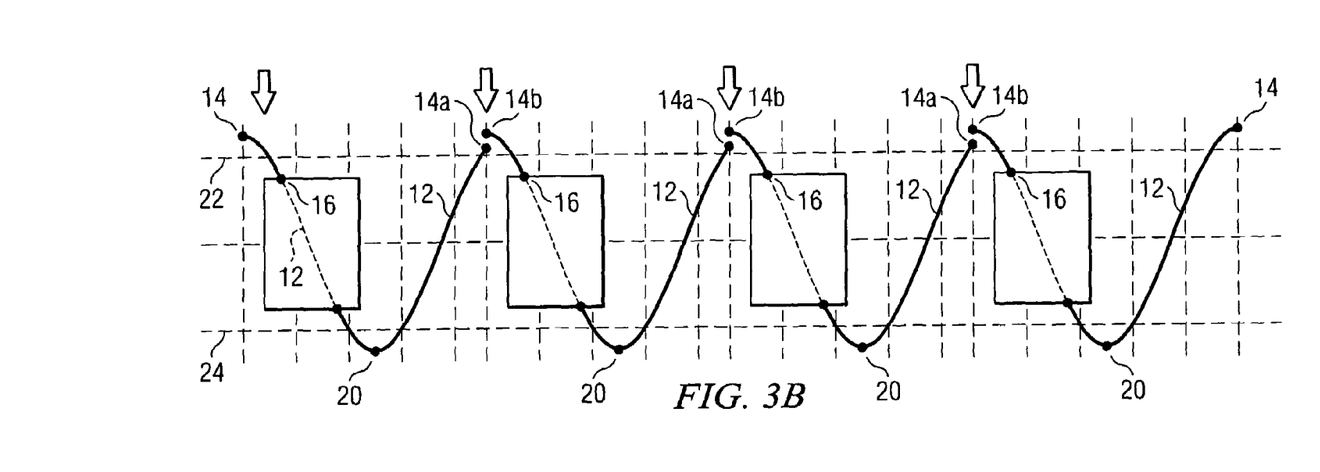

FIG. 3B illustrates the opposite condition, wherein successive transition points occur more rapidly than the transition point 14 of the nominal sinusoidal drive signal. Consequently, the peak portion of the positive signal is compressed so that the exact peak or start point 14b occurs earlier than nominal to assure that each image frame is properly placed. As shown, the positive peak portion of the drive signal is compressed by removing portions of the drive signal between the end point 14a and the exact peak or start point 14b. This effectively reduces the count "T" in the above discussed equations. Further depending on the resolution chosen for discrete time steps, this process may amount to adding or subtracting a single sample, i.e., "T" may be constant to within a single count.

Figure 4A:
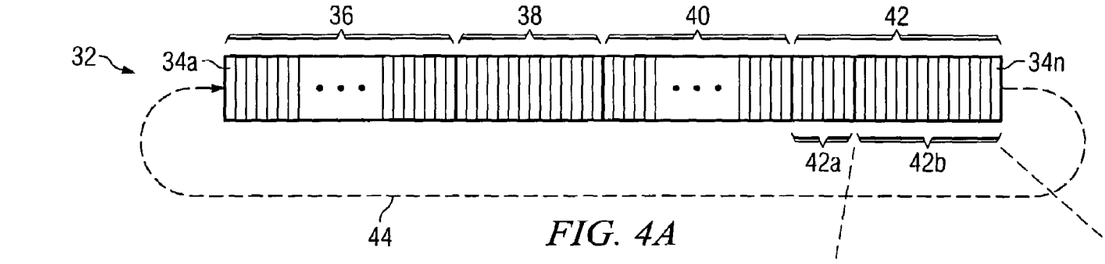
FIGS. 4A and 4B show a circular buffer with an adjustable pointer that determines the wrap around or end point of the buffer.
Figure 4B:
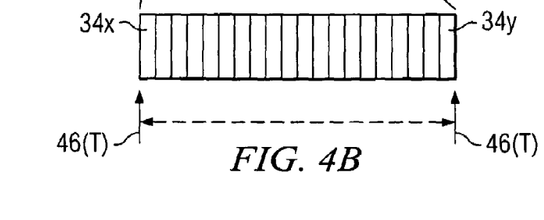

One effective method of expanding or compressing the peak portion of the drive signal between the end point 14a of one cycle and the exact peak or start point 14b of the slow speed drive signal of the next cycle is to generate a table of values representative of a cyclic signal such as for example a sinusoidal cyclic signal as illustrated in FIG. 1A or a repetitive triangular shaped signal as illustrated in FIG. 1C. These values are stored in a circular buffer memory such as buffer 32 illustrated in FIGS. 4A and 4B that are provided at a fixed clock rate to a D/A converter, which in turn provides the drive signal used to position the slow speed mirror. As shown in FIG. 4A, circular buffer 32 includes a multiplicity of storage locations 34a-34n for storing the table of values as discussed above. Further, for purposes of explanation only, buffer 32 illustrates a first group 36 of stored values representing the display portion of the drive signal, a second group 38 representing the bottom or lower peak portion, a third group 40 representing the blanked retrace portion of the drive signal, and a fourth group 42 representing the top or upper peak portion of the drive signal. However, since according to the described embodiment, discussed with respect to FIGS. 3A and 3B, it is necessary to always start at the exact peak 14b of the signal waveform, group 42 of the stored discrete values is illustrated as being divided into portions 42a and 42b. Portions identified by 42a represent a first portion of the top or upper peak portion 42 having a fixed and minimum number of discrete values, and reference number 42b represents discrete values for a second or adjustable portion of the drive signal. As discussed above and as will be appreciated by those skilled in the art, each discrete value is clocked out of the circular buffer 32 in sequence and then as indicated by dashed arrow 44 when the last value (representing end point 14a) of stored group 42 as determined by pointer 46 is clocked out of the buffer, the sequence starts over at the beginning location 34a of the buffer. As shown in FIG. 4B, pointer 46 can be set to any position or data storage location of the buffer between value 34x and 34y. Location 34a is the exact peak value of the drive signal and corresponds to peak or start point 14b of FIGS. 3A and 3B. This peak point adjusting process is continually repeated for each cycle to provide the cyclic drive signal. In a typical circular buffer, the number of stored values will typically be the same or fixed for each cycle. However, to allow the positive transition portion of the cyclic signal, represented by the group 42 of discrete values, to be adjusted by expansion or compression as discussed above and according to the present invention, the top or positive peak portion 42 (or according to an alternate embodiment the bottom peak portion 38) will include a number of discrete values stored in storage locations of the buffer 32 that can be greater than or less than the number required for a nominal drive signal. The extra number (or reduced number) of drive signal points or discrete values allows the timing of the peak 14b of the signal waveform to be adjusted. Thus, the number of discrete values between the end point (as calculated) 14a and the start point 14b of the buffer at "T" is adjusted by positioning the pointer 46 between the extreme left (34x) and the extreme right (34y) locations as indicated in FIG. 4B to include a selected or calculated number of the discrete values necessary to achieve the desired synchronization regardless of whether the timing needs to be increased or decreased.

Simply put, to expand the transition portion of the drive signal, a number of the discrete values that is larger than the number required for a nominal drive signal are included by pointer 46. On the other hand to compress the cycle and the start point 14b, the pointer 46 is moved or adjusted to include a number of the discrete values that is less than that required for a nominal signal. To assure the necessary flexibility of the system, portion 42 of the buffer will always include the number of discrete values required for a minimal allowable complete cycle (indicated at 42a). To this minimum number of discrete values, a sub-group of additional discrete values (42b) are included that will be sufficient to expand the cycle to a level well beyond which would normally be required. Thus, upon receiving the timing or interrupt signal, the number of additional discrete values in sub group 42b required to expand or compress the drive cycle is determined or calculated and the pointer moved to the appropriate location. Therefore, when the buffer outputs the value at the last location as indicated by pointer 46, representative of end point 14a, it then outputs the discrete value at the beginning location 34a of the buffer representing the peak point 14b. Thus, the period for each cycle of the slow speed drive signal is determined and adjusted for each image frame to assure proper positioning of the image on the display screen. It should be appreciated that the circular buffer will typically include a much larger number of discrete value storage locations than show in FIGS. 4A and 4B. Instead of the six locations shown at bracket 42a and the 2D illustrated at bracket 42b. The number of actual storage locations could be several hundred times greater to assure sufficient resolution.

Another technique for synchronizing is by "clock stretching". Referring again to the equations 1 and 2 that define y(t), it will be appreciated that these equations assume a constant sample time ($T_s$). As an example, if the sample time between two conservative samples is 10 µseconds (microseconds) then adjusting the number of samples only allows for a minimum resolution of 10 microseconds. However, if the output clock pulses were adjusted by a small amount, such as for example adjusted from 10 microseconds to 10.3 microseconds, a much finer resolution is possible. Of course, the nominal (e.g., 10 microseconds) would be restored before the display portion of the cycle.

It is also important to note that adjusting (expanding or compressing) the peak portions of the cyclic slow speed drive signal is shown as being accomplished in the upper peak portions of the drive signal (the portion above line 22), while the video signal is blanked or cut off. It should also be appreciated that although FIGS. 3A and 3B illustrate the adjustment as taking place in the upper or positive peak portions, similar effective adjustments could be made in the lower peak portion (i.e. portions below line 24). Alternately, a portion of the required adjustment could take place in the upper peak portions and another portion in the lower peak portions.

For embodiments where an image scan line is generated only during one direction of the scanning mirror beam sweep, the method discussed above will satisfactorily position the image frame on a display screen or a page. However, to increase the speed of printing or the brightness and/or resolution of an image display, it will be advantageous to generate a scan line during both the forward and reverse scans of the high speed mirror. Therefore, to assure that the adjacent forward and reverse scan lines are properly aligned, it is important to precisely control the horizontal placement of the first and last pixel of each scan line.

More specifically, as was discussed above, with respect to a system that creates a scan line only during one direction of an oscillating signal, an "arming" signal is generated when the slow speed positioning mirror is at a particular position in its cyclic travel. The "arming" signal is then used to vertically position the first scan line of an image frame. Also, with a unidirectional scanning system, a single "trigger" signal is generated during each cycle of the high speed mirror to release the image data from a storage buffer and start the display of each scan line at approximately the same horizontal location every time. Since the speed of the mirror through the display portion of the beam sweep as it moves in one direction is substantially constant from line to line, and since the clocking of pixel data onto the laser beam will always be the same for each beam sweep, horizontally aligning the first pixel of each scan line will be sufficient since the last pixels will also be similarly aligned. However, for a bi-directional system, aligning the first and last pixels of the forward scan lines generated by the forward sweep with the last and first pixels of the reverse scan lines generated by the reverse sweep is substantially more difficult.

Figure 1D:
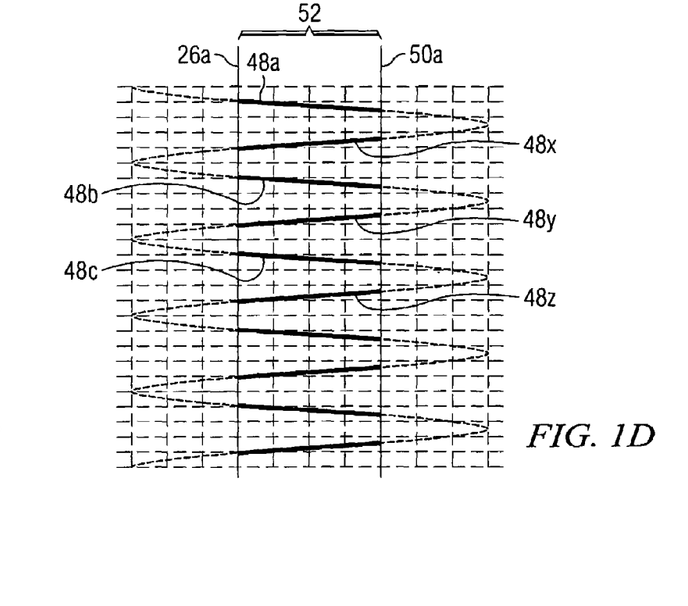
FIG. 1D illustrates the high speed resonant beam sweep and display portions of a bi-directional display.

This increased difficulty in aligning scan lines of a bi-directional display compared to a display of image lines generated in only one direction (i.e., a unidirectional scanned display) may be better understood by referring to FIGS. 1B and 1D. If as an example, line 26a represents the location of the start of the output or display of data onto a forward scan line (i.e., traveling left to right), and line 26b represents the location of the last bit or pixel of a scan line, a frame of image of a unidirectional system will be displayed on the screen between lines 26a and 26b. In the illustrated example of FIG. 1B, the forward portion of each drive cycle between lines 26a and 26b indicated by heavy lines represents the portion of the drive signals at which an image scan line of data for a unidirectional system will be displayed. The reverse portions of the drive signal between lines 26a and 26b that are not shown by heavy lines represent a retrace in a unidirectional scanned display. Therefore, as discussed above, since the speed of the mirror between limit lines 26a and 26b will always be substantially identical for consecutive sweep cycles and since each scan line will include the same number of pixels outputted on the scanning beam at a constant clock rate, always placing the first pixel of each scan line at the start location represented by line 26a of FIG. 1B will result in an aligned image.

Unfortunately, aligning successive scan lines in a bi-directional display is not so easy. Therefore, referring now to FIG. 1D, the beam sweep of a bi-directional display is illustrated. As shown, FIGS. 1B and 1D are similar, except that the display portions represented by heavy lines is present for both the forward and reverse sweeps (i.e., lines 48a, 48b, 48c, and lines 48x, 48y, and 48z). For example, line 26a still represents the start point of each forward moving scan line, and the end or last pixel of each forward moving scan line will still be aligned with the end or last pixel of every other forward moving scan line. These end points should coincide or fall along line 50a. However, line 50a acutally represents the starting pixel for the reverse moving scan line, and not necessarily the location of the last or end pixels of the forward scan. However, as will be appreciated, to avoid a distorted image, the end pixels of the forward moving scan line must also fall substantially on line 50*a*, and the last or end pixels of the reverse scan lines must also fall substantially on line 26*a*. However, until the teachings of the present invention, such alignment has not been an easy task. The problem arises from the difficulty of calculating with sufficient precision the exact placement of the start points of both the forward and reverse first pixels. A slight horizontal deviation from the ideal start location for each scan line of a unidirectional display will not typically be detectable since the start and end points of each scan line will still be aligned. However, the same slight horizontal variation from the ideal start point or placement of one or both of the forward and reverse scan lines may cause unacceptable jagged edges on the resulting image frame.

The jagged edge problem is solved according to the present invention by adjusting the rate at which pixels are modulated onto the laser beam so as to allow the scan lines of the image to be very precisely controlled to fall in the appropriate portion of the mirror's travel. Additionally, this approach allows simpler automated calibrations to set the scan amplitude and the starting location of the first pixel on each line. As was mentioned above, preferably two sensors are physically located to accurately detect the envelope of the mirror travel and to provide the data necessary to determine the correct starting point of an image scan line.

As an example, and referring again to FIG. 1D, it is assumed that the pixels are to be distributed across a scan line so that they fall in the most linear 50% portion (indicated by reference number 52) of each half cycle of the sinusoidal wave form lying between lines 26*a* and 50*a*. This is 25% of the total waveform since there are two 50% portions per cycle. It is further assumed the resonant frequency of the high speed scanning mirror is 20 KHz, and 1000 pixels are to be distributed and displayed on each scan line. Therefore, each pixel is allotted 12.5 nanoseconds. That is, each complete scan cycle is 50µ seconds at a resonant scan rate of 20 KHz (½₀ KH) and therefore, one half cycle is 25µ seconds. Thus, the most linear 50% portion of a half cycle will be allocated 12.5µ seconds for the 1000 pixels, and therefore, each pixel is allotted 12.5 nanoseconds. To provide this pixel rate, a clocking rate of 80 MHz will be required. Using these exact numbers, would result in an image that is located precisely in the linear middle portion of each half cycle of the mirror travel, and a starting point for the pixel modulation of the laser at a point exactly 25% from each cycle peak would mean consecutive scan lines would be properly aligned.

However, as was discussed above, the resonant frequency of a scanning mirror is unlikely to be exactly at its design frequency of 20 KHz. As an example only, a scanning mirror having a design frequency of 20 KHz may have an actual resonant frequency of 20.1 KHz. Therefore, if the same 80 MHz clocking rate is used, and it is still desired to hold the starting pixel location precisely at 25% of the travel from a wave form peak, the higher resonant frequency of the scanning mirror will result in the last or end pixel of a scan line moving by approximately 5 pixel places. This means that each edge of a bi-directional generated image will be distorted unless this misalignment between consecutive scan lines is corrected.

This misalignment is corrected according to the prior art by manual calibration to adjust the 25%. Unfortunately, this means that a fixed sensor cannot be used to detect and/or determine the scan line starting point.

However, by using the same method as was described above for a 20 KHz resonant frequency mirror, the required clocking rate can be calculated for a scanning mirror having a 20.1 KHz resonant frequency. In this example, the clocking rate for a 20.1 KHz resonant scanning mirror would be 79.6 MHz. Such an adjustment to the clocking rate may be readily achieved by using a voltage controlled crystal oscillator to provide the clocking pulses.

It should also be appreciated that although the above detailed discussion has been with respect to a "sinusoidal" slow speed drive signal, such as shown in FIG. 1A, the discussion is equally applicable to the repetitive "triangular shaped" drive signal such as illustrated in FIG. 1C.

It should further be appreciated that although the above description of the invention described a sinusoidal display system, it will be appreciated by those skilled in the art that the same techniques can be used to align the bi-directional scan lines of a high speed laser printer. Of course, when used with a printer, a low frequency mirror will not typically be used to provide the orthogonal motion to the sweeping beam that results in the consecutive scan lines being spaced form each other. As will be appreciated by those skilled in the art, the orthogonal motion necessary to space the scan lines is typically provided in a printer by a rotating photosensitive drum.

Figure 5A:
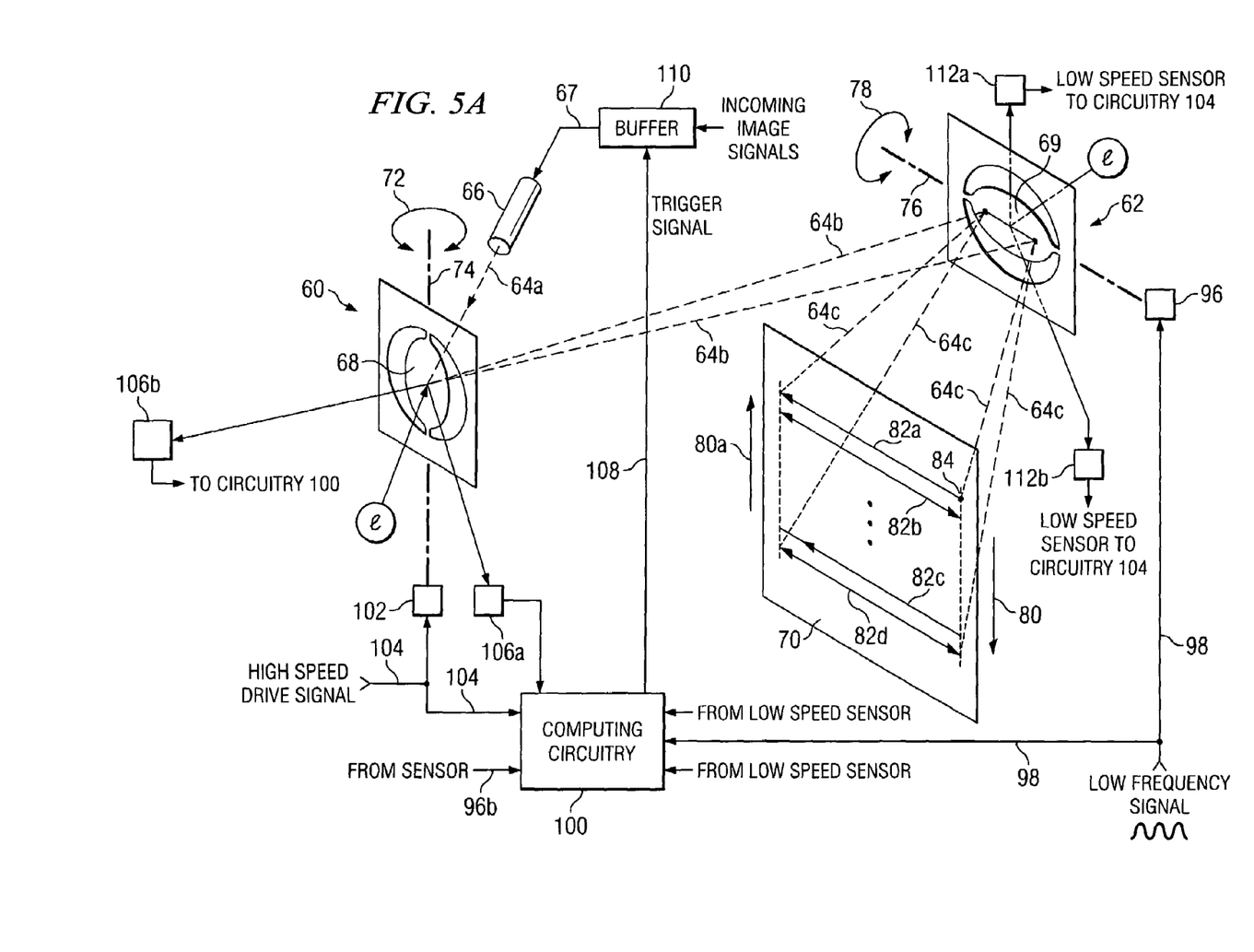
FIGS. 5A and 5B are simplified diagrams illustrating a torsional hinged mirror display system using two single axis mirrors.

Referring now to FIG. 5A, there is a perspective illustration of an embodiment of the present invention as used in a visual display that uses two separate single axis mirrors such as discussed above that pivot about their torsional hinges. As shown, a high frequency or scanning single axis torsional hinged mirror 60 may be used in combination with a low frequency or positioning single axis torsional hinged mirror 62 to provide a raster scan. A light beam 64*a* from a source 66 is modulated by incoming signals on line 67 to generate pixels that comprise the scan lines. The modulated light beam 64*a* impinges on the high frequency resonant mirror 60 and is reflected from surface 68 as sweeping light beam 64*b* to the reflecting surface 69 of the low frequency positioning mirror 62. Positioning mirror 62 redirects the modulated light beam 64*c* to a display surface 70, which may be a display screen or other light sensitive medium. The oscillations of the high frequency scanning mirror 60 (as indicated by arcuate arrow 72) around pivot axis 74 results in light beam 64*c* (the scan lines) sweeping across the surface 70, whereas the oscillation of the positioning mirror 62 about axis 76 (as indicated by double headed arrow 78) results in the scan lines being positioned vertically (or orthogonally to the scan lines) on the display surface 70. It is again noted that the terms horizontal and vertical are for explanation purposes only. Therefore, since the scanning motion of light beam across display surface 70 may occur several hundred or even a thousand times during the orthogonal movement in one direction of the low speed positioning mirror 62, as indicated by arrow 80, a raster scan type image can be generated on display surface 70 as indicated by image lines 82*a*, 82*b*, 82*c*, and 82*d*. According to another embodiment, the light beam 64*c* may also be used to paint another image in the reverse direction as indicated by arrow 80*a*. To do this, the mirror travels back to the starting point 84 and then starts over.

Figure 5B:
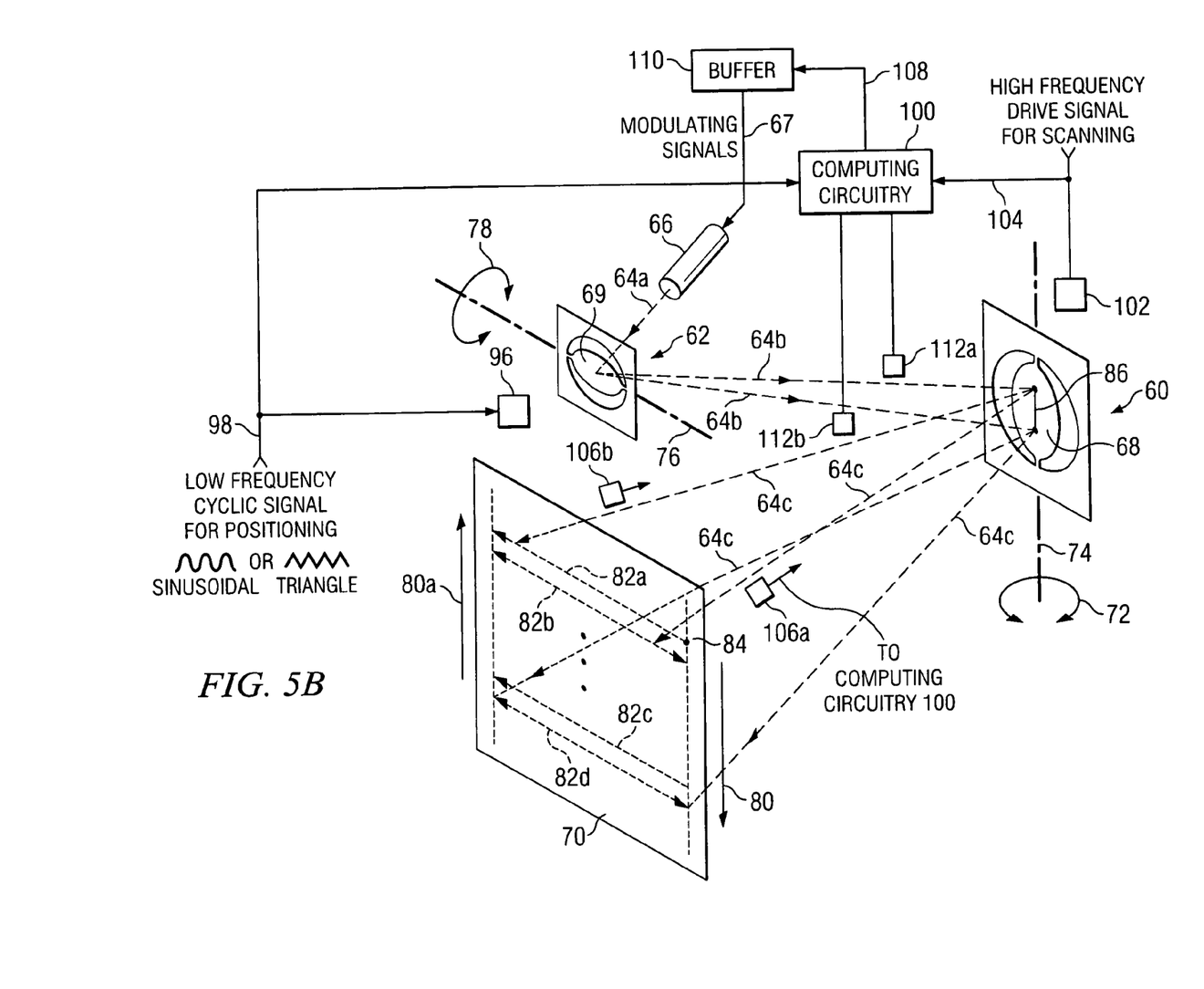

Referring to FIG. 5B, there is another perspective illustration of an embodiment of the present invention using two separate single axis mirrors that pivot about their torsional hinges. As shown, a high frequency or scanning single axis torsional hinged mirror 60 may be used in combination with a low frequency or positioning single axis torsional hinged mirror 62 to provide a raster scan type visual display. A light beam 64*a* from a source 66 is modulated by incoming video signals and impinges on the low frequency positioning mirror 62. The modulated light beam 64*b* is then reflected off of mirror surface 69 to reflecting surface 68 of the high frequency oscillation or scanning mirror 60, which redirects the modulated light beam 64*c* to display screen or surface 70. The oscillations (as indicated by arcuate arrow 72) of the scanning mirror 60 about axis 74 results in light beam 64c sweeping across display screen 70.

It will also be appreciated that oscillations of the positioning mirror 62 about axis 76 as indicated by double headed arcuate arrow 78 will move the reflected modulated light beam 64b with respect to scanning mirror 60 such that the light beam 64b moves orthogonally to the scanning motion of the light beam as indicated by line 86 in the middle of reflecting surface 68. Thus, it will be appreciated that since the high frequency scanning motion of the light beam 64c as indicated by image lines 82a, 82b, 82c, and 82d on display screen 70 occurs several hundred or even a thousand times during a single orthogonal movement of the low frequency positioning mirror, a raster scan type visual display can be generated or painted on display screen 70 as indicated by arrow 80. The light beam 64c then returns or travels back to the starting point 84 as indicated by arrow 80a.

The above discussion is based on two single axis torsional hinged mirrors. However, as will be appreciated by those skilled in the art, a single dual axis torsional hinged mirror, such as mirror structure 90 shown in FIG. 5C may used to provide both the high frequency scanning motion about axis 74a as indicated by arcuate arrow 72, and the positioning or orthogonal motion about axis 76, in the same manner as the oscillation of the individual mirrors 60 and 62 discussed in the embodiment of FIGS. 6A and 6B. The remaining elements of FIG. 6C operate the same as in FIGS. 6A and 6B and consequently carry the same reference number. It should also be noted, however, that the modulated light beam 64a is only reflected one time and, therefore, the reflected beam carries reference number 64d.

Referring again to FIGS. 5A, 5B, and 5C as shown, there is shown a drive mechanism 96 for positioning the low speed mirror 62 in response to a low frequency cyclic signal such as illustrated in FIGS. 1A and 1B and which is received on input line 98. This low frequency cyclic drive signal is also provided to computing circuitry 100 and, as discussed above, may be used to determine or estimate the position of mirror 62.

Figure 5C:
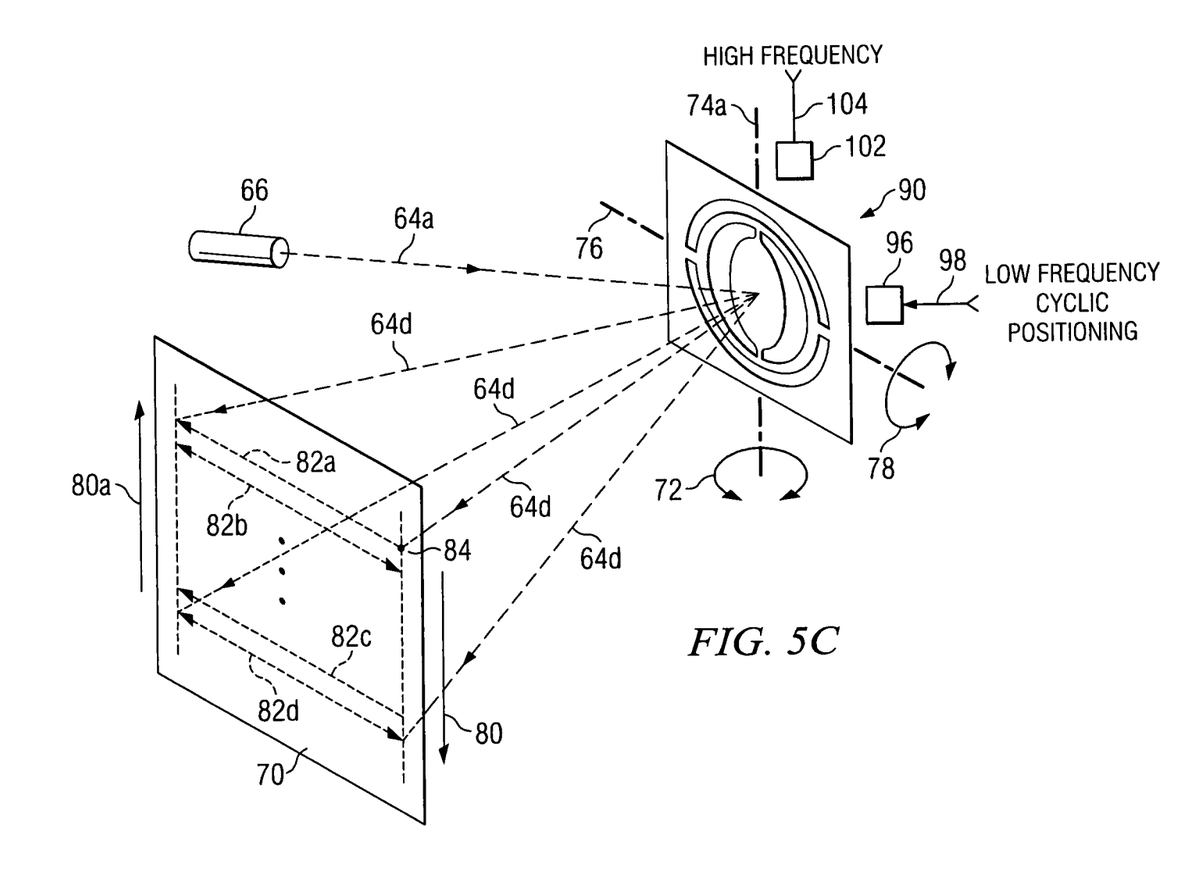
FIG. 5C is a simplified diagram illustrating another embodiment comprising a single dual axis mirror that replaces the two single axis mirrors.

Similarly, there is included a high speed drive mechanism 102 responsive to high frequency signals on input line 104 for driving the high speed mirror at its resonant frequency. The high frequency drive signals are also provided to computing circuitry 100. However, as discussed above, it should be noted, that the position of the high speed resonant mirror 60 cannot accurately be determined or inferred from the drive signal, and consequently, an external sensor 106a (or preferably sensors 106a and 106b) along with a feedback circuitry connected to computing circuitry 100 is required to determine the position of the high speed resonant mirror. Then, as shown, the "trigger" signal is calculated and provided on line 108 to buffer 110 to initiate the release or distribution of the data stream for each scan line.

FIGS. 5A and 5B also illustrate that sensors 112a and 112b may be included to monitor the actual position of the low frequency mirror, just as sensors 106a and 106b were used to monitor the actual position of the high speed mirror. However, as was also mentioned, for most applications, it is not necessary to include such sensors for the low speed mirrors.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the structure or methods and steps described in the specification. As one of ordinary skill in the art will readily appreciate from the disclosure of the present invention, structure, methods, or steps, presently existing or later to be developed, that perform substantially the same function or achieve substantially the same result as the corresponding embodiments described herein may be utilized according to the present invention. Accordingly, the appended claims are intended to include within their scope such structures, methods, or steps.

What is claimed is:

1. In an imaging system comprising a high speed oscillating mirror having a known resonant frequency for generating image scan lines, a method for generating an image at a selected location on a receiving medium, said method comprising the steps of:
   sensing the actual position of said mirror as it oscillates at its resonant frequency;
   selecting a number of image pixels to be displayed along each scan line;
   predetermining a portion of said scan lines, which is an approximately linear portion of a sinusoidal signal, for displaying said selected number of pixels, said portion defined by a start location and an end location; and
   determining a fixed rate output clocking pulse rate and a start point for modulating said image scan lines such that said related number of pixels to be displayed along said scan line will be linearly distributed along said scan line with equal spacing to extend from said start location to said end location.

2. The method of claim 1 wherein a formed scan line is generated by a forward sweep portion of said oscillating minor and a reverse scan line is generated by a reverse sweep portion of said oscillating mirror.

3. The method of claim 2 wherein said step of selecting a portion of said scan line for displaying pixels comprises selecting a portion of said forward scan line and said reverse scan line such that said start location of said forward scan line is aligned with said end location of said reverse scan line, and said start location of said reverse scan line is aligned with said end location of said forward scan line.

4. The method of claim 1 further comprising the step of providing clock pulses at said determined clocking pulse rate from a voltage controlled crystal oscillator.

5. The method of claim 1 wherein said step of sensing the actual position of said oscillating minor is accomplished by a single sensor to determine the start point for modulating said scan lines.

6. The method of claim 3 wherein said step of sensing the actual position of said oscillating mirror is accomplished by a first sensor for determining the start point of said forward scan line and a second sensor determining the start point of said reverse scan lines.

7. The method of claim 1 further comprising the step of providing relative motion between said receiving medium and said scan lines.

8. The method of claim 7 wherein said imaging system is used with a printing device and said receiving medium is a rotating photosensitive drum.

9. The method of claim 7 wherein said imaging system is used with a visual display device said relative motion between said receiving medium and said scan lines is provided by a low frequency oscillating mirror for orthogonally positioning scan line.

10. The method of claim 3 further comprising the step of providing relative motion between said receiving medium and said scan lines.

11. The method of claim 10 wherein said imaging system is used with a printing device and said receiving medium is a rotating photosensitive drum.

12. The method of claim 10 wherein said imaging system is used with a visual display device said relative motion between said receiving medium and said scan lines is provided by a low frequency oscillating mirror for orthogonally positioning scan line.

13. A method of generating an image at a selected location on a medium comprising the steps of:
- oscillating a mirror at its resonant frequency;
- directing a modulated light beam onto said oscillating minor such that said light beam is reflected and sweeps back and forth across said medium to form scan lines;
- providing relative orthogonal motion between said medium and said scan lines;
- predetermining a portion of said scan lines, which is an approximately linear portion of a sinusoidal signal, for displaying an image;
- sensing the position of said oscillating mirror at least once per oscillation cycle;
- providing a predetermined number of image signals to be displayed as image pixels along each scan line; and
- determining a series of pulses, having a fixed output clock rate and a start location such that said predetermined number of image pixels are linearly distributed with equal spacing along said scan line so that they fill said selected portion of said scan line.

14. The method of claim 13 wherein a forward scan line is generated by a forward sweep portion of said sweeping light beam and a reverse scan line is generated by a reverse sweep portion.

15. The method of claim 14 wherein said step of selecting a portion of said scan line for displaying pixels comprises selecting a portion of said forward scan line and said reverse scan line such that said start location of said forward scan line is aligned with said end location of said reverse scan line, and said start location of said reverse scan line is aligned with said end location of said forward scan line.

16. The method of claim 15 further comprising the step of providing said series of pulses from a voltage controlled crystal oscillator.

17. The method of claim 13 is used with a printing device and said medium is a rotating photosensitive drum.

18. The method of claim 13 is used with a visual display and said relative motion is provided by a low frequency oscillating minor for orthogonal positioning.

\* \* \* \* \*